United States Patent
Murdoch (10) Patent No.: US 12,462,364 B2
(45) Date of Patent: Nov. 4, 2025

(54) REDUCING THE RISK OF DROPPED STRINGS THOUGH THE IMPLEMENTATION OF IMAGE PROCESSING

(71) Applicant: SAUDI ARABIAN OIL COMPANY, Dhahran (SA)

(72) Inventor: Euan Martin Murdoch, Aberdeenshire (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 320 days.

(21) Appl. No.: 18/344,557

(22) Filed: Jun. 29, 2023

(65) Prior Publication Data

US 2025/0005728 A1 Jan. 2, 2025

(51) Int. Cl.
G06T 7/00 (2017.01)
E21B 19/06 (2006.01)
G06T 7/70 (2017.01)
G06V 10/764 (2022.01)

(52) U.S. Cl.
CPC ............ G06T 7/0002 (2013.01); E21B 19/06 (2013.01); G06T 7/70 (2017.01); G06V 10/764 (2022.01); G06T 2207/20081 (2013.01)

(58) Field of Classification Search
CPC ..................... G06T 7/0002; G06T 7/70; G06T 2207/20081; E21B 19/06; G06V 10/764
See application file for complete search history.

(56) References Cited

U.S. PATENT DOCUMENTS

| 2015/0345261 A1 | 12/2015 | Kruspe et al. |
| 2016/0130917 A1 | 5/2016 | Torrione |
| 2020/0224523 A1* | 7/2020 | Parmeshwar ......... E21B 19/165 |

(Continued)

FOREIGN PATENT DOCUMENTS

| WO | 2020/086594 A1 | 4/2020 |
| WO | 2022/093774 A1 | 5/2022 |

OTHER PUBLICATIONS

Chatar, Crispin et al., "Determining Rig State from Computer Vision Analytics"; Proceedings of the SPE/IADC International Drilling Conference and Exhibition; Paper No. SPE-204086-MS; pp. 1-15; Mar. 8, 2021 (15 pages).

(Continued)

*Primary Examiner* — John B Strege
(74) *Attorney, Agent, or Firm* — Osha Bergman Watanabe & Burton LLP (57) ABSTRACT

A method and a system for reducing the risk of dopped string through the implementation of image processing are disclosed. The method includes obtaining a plurality of images of a rotary table, a lower elevator latching position, and an upper elevator position from a rig and analyzing the plurality of images of the rotary table, the lower elevator latching position, and the upper elevator position with an artificial intelligence (AI) model to detect a type of the elevators and a latching string component. Further, an operability of the elevators and an operability of the latching string component, and a compatibility between the latching string component and the elevators are determined. Additionally, an instruction based on the determined compatibility is generated, the instruction allowing a latching process to continue or initiating an interlock to stop the latching process.

20 Claims, 8 Drawing Sheets (56) References Cited

U.S. PATENT DOCUMENTS

| | | |
|---|---|---|
| 2020/0224524 A1* | 7/2020 | Parmeshwar ........... E21B 47/09 |
| 2020/0224525 A1* | 7/2020 | Parmeshwar ........... E21B 44/00 |
| 2022/0025759 A1 | 1/2022 | Magana-Mora et al. |
| 2022/0127949 A1 | 4/2022 | Machocki et al. |
| 2022/0277635 A1 | 9/2022 | Michalopulos et al. |
| 2022/0290513 A1 | 9/2022 | Zheng |

OTHER PUBLICATIONS

He, Junjiang et al., "Drilling Rig Hoisting Platform Security Monitoring System Design and Application"; Machines; vol. 5, Issue 3, Article 19; pp. 1-15; Sep. 2017 (15 pages).

\* cited by examiner

REDUCING THE RISK OF DROPPED STRINGS THOUGH THE IMPLEMENTATION OF IMAGE PROCESSING

BACKGROUND

Although dropping strings is not a regularly occurring event, making and breaking connections with strings is an operation that is conducted more frequently. Due to the human factor, making or breaking the connections with strings may occasionally go wrong. While the dropped string may be a low occurrence event, it has a high severity. It may lead to a long period of non-production time (NPT) or even to loss of the well.

The industry currently relies on mechanical systems and processes to avoid the dropped strings, but such solutions are still leading to mistakes. Specifically, human failures permit a bypass of such systems. It is easy to not correctly size or latch the elevators or to miss the locking pin and have the elevators open unexpectedly. Further, the use of dog collars may also be implemented incorrectly, because dog collars are intended to be used when there is not enough weight to ensure the slips bite correctly. As such, the dog collars are occasionally forgotten or fitted incorrectly.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method including obtaining a plurality of images of a rotary table, a lower elevator latching position, and an upper elevator position from a rig and analyzing the plurality of images of the rotary table, the lower elevator latching position, and the upper elevator position with an artificial intelligence (AI) model to detect a type of the elevators and a latching string component. Further, an operability of the elevators and an operability of the latching string component, and a compatibility between the latching string component and the elevators are determined. Additionally, an instruction based on the determined compatibility is generated, the instruction allowing a latching process to continue or initiating an interlock to stop the latching process.

In general, in one aspect, embodiments disclosed herein relate to a system including a camera and an image recognition simulator comprising a computer processor. Further, the computer processor comprises functionality for obtaining a plurality of images of a rotary table, a lower elevator latching position, and an upper elevator position from a rig and analyzing the plurality of images of the rotary table, the lower elevator latching position, and the upper elevator position with an artificial intelligence (AI) model to detect a type of the elevators and a latching string component. Further, an operability of the elevators and an operability of the latching string component, and a compatibility between the latching string component and the elevators are determined. Additionally, an instruction based on the determined compatibility is generated, the instruction allowing a latching process to continue or initiating an interlock to stop the latching process.

In general, in one aspect, embodiments disclosed herein relate to a non-transitory computer readable medium storing a set of instructions executable by a computer processor, the set of instructions including the functionality for obtaining a plurality of images of a rotary table, a lower elevator latching position, and an upper elevator position from a rig and analyzing the plurality of images of the rotary table, the lower elevator latching position, and the upper elevator position with an artificial intelligence (AI) model to detect a type of the elevators and a latching string component. Further, an operability of the elevators and an operability of the latching string component, and a compatibility between the latching string component and the elevators are determined. Additionally, an instruction based on the determined compatibility is generated, the instruction allowing a latching process to continue or initiating an interlock to stop the latching process.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a method and system for image processing to reduce the risk of dropped strings. Specifically, the method uses camera analytic techniques to monitor rig operations and provide a safety interlock to stop or warn the rig operator from picking up the string. In one or more embodiments, the camera analyses the image or video for elevators that are incorrectly latched, elevator's locking pins that are not fitted, the elevators that are incorrectly sized for a connection size, slips that are incorrectly fitted or sized, dog collars that are incorrectly fitted, etc.

In one or more embodiments, this method may be implemented on already existing hardware packages as a plug-in module. The plug-in module may be deployed on the existing camera analytics setup. Initially the hardware package may be deployed as a standalone setup, with an interface provided to the driller to run Graphical User Interface (GUI). That ensures that the development and roll-out phase of the project are easier to implement, without requiring a permanent rig fixture. Alternatively, the system may be integrated directly to the rig to form an interlock system to stop traveling blocks from being picked up in the event of an unsafe situation. The traveling blocks ("blocks") are mounted on the top drive and the blocks are responsible for supporting and moving the string.

While camera analytics technology is not applicable to every situation, it is useful at monitoring a fixed activity at a fixed point in space. The latching of elevators and fitting of slips always happens in the same area of the rig, so these processes lend themselves to being monitored.

Further, embodiments disclosed herein enable a user to operate from a distance, without an effect on normal operations. The method uses techniques including modelling and software based on artificial intelligence (AI) models, including machine learning and deep learning, for image and video processing. The images and data obtained by camera are fed into processing systems that initially learn what a good elevator latch looks like. The AI models compare each latch to confirm that the latch has been done correctly. In a case that an incorrect latch is detected, a warning will be issued to stop the operator from picking up the blocks and avoiding a potential dropped string. The same technique may also be applied to the location and correct deployment of slips.

The camera analytics system may also be used to measure the size of the connection and compare the measured size to the size of the elevators and slips fitted to the rig to ensure that they are correctly sized, thereby reducing the risk of dropped strings. Other benefits of this disclosure include reducing non-production time (NPT) from dropped string events, reducing the need to abandon or sidetrack a well after a lost string event, reducing the carbon emissions caused by abandoning or sidetracking the well, improving safety of the operations, and improving the adherence to processes and procedures.

Figure 1:
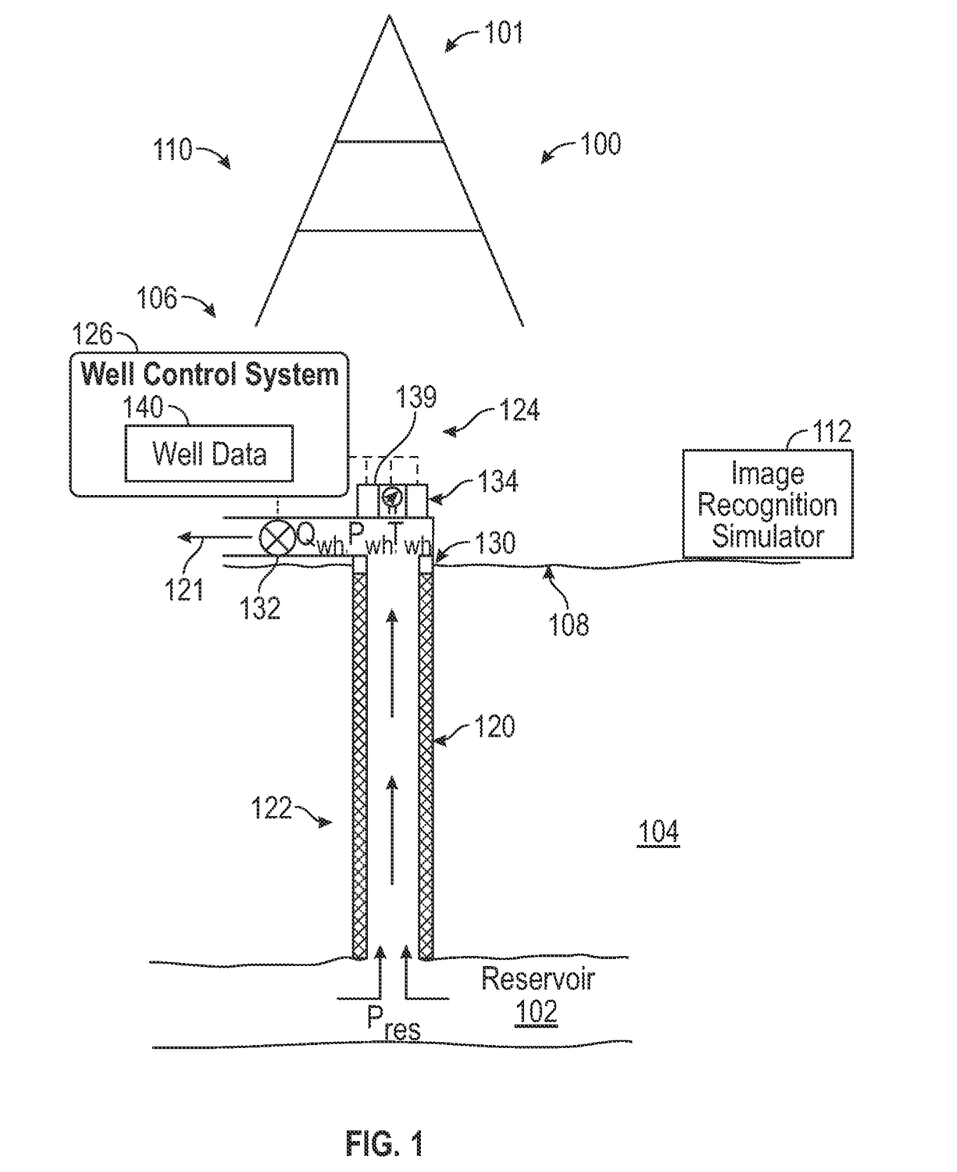
FIG. 1 shows a system according to embodiments of the present disclosure.
Figure 2:
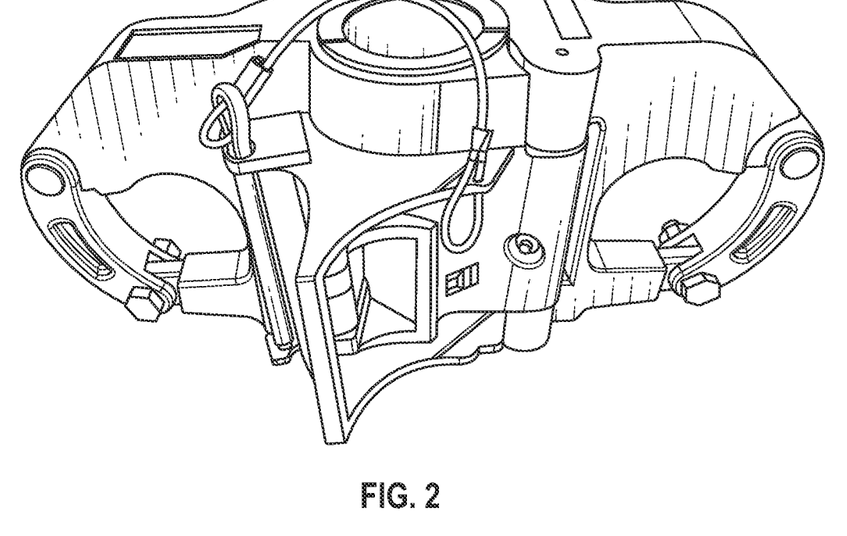
FIG. 2 shows a system according to embodiments of the present disclosure.

FIG. 1 shows a schematic diagram in accordance with one or more embodiments. As shown in FIG. 1, a well environment (100) includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath a geological surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a rig (101), a drilling system (110), an image recognition simulator (112), a wellbore (120), a well sub-surface system (122), a well surface system (124), and a well control system ("control system") (126). The drilling system (110) may include a drill string, a drill bit, and a mud circulation system for use in drilling the wellbore (120) into the formation (104). The well control system (126) may control various operations of the well system (106), such as well production operations, well drilling operation, well completion operations, well maintenance operations, and reservoir monitoring, assessment and development operations. In some embodiments, the well control system (126) includes a computer system that is the same as or similar to that of a computer system (800) described below in FIG. 8 and the accompanying description.

The rig (101) is a combination of equipment used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) lowered into the hydrocarbon-bearing formation (104) or the reservoir (102) during monitoring operations (e.g., during in situ logging operations).

In some embodiments, during operation of the well system (106), the well control system (126) collects and records well data (140) for the well system (106). During drilling operation of the well (106), the well data (140) may include mud properties, flow rates measured by a flow rate sensor (139), drill volume and penetration rates, formation characteristics, etc. To drill a subterranean well or wellbore (120), a drill string (110), including a drill bit and drill collars to weight the drill bit, may be inserted into a pre-drilled hole and rotated to cut into the rock at the bottom of the hole, producing rock cuttings. Commonly, the drilling fluid, or drilling mud, may be utilized during the drilling process. To remove the rock cuttings from the bottom of the wellbore (120), drilling fluid is pumped down through the drill string (110) to the drill bit. The drilling fluid may cool and lubricate the drill bit and provide hydrostatic pressure in the wellbore (120) to provide support to the sidewalls of the wellbore (120). The drilling fluid may also prevent the sidewalls from collapsing and caving in on the drill string (110) and prevent fluids in the downhole formations from flowing into the wellbore (120) during drilling operations. Additionally, the drilling fluid may lift the rock cuttings away from the drill bit and upwards as the drilling fluid is recirculated back to the surface. The drilling fluid may transport rock cuttings from the drill bit to the surface, which can be referred to as "cleaning" the wellbore (120), or hole cleaning.

In some embodiments, the well data (140) are recorded in real-time, and are available for review or use within seconds, minutes, or hours of the condition being sensed (e.g., the measurements are available within 1 hour of the condition being sensed). In such an embodiment, the well data (140) may be referred to as "real-time" well data (140). Real-time well data (140) may enable an operator of the well (106) to assess a relatively current state of the well system (106), and make real-time decisions regarding a development of the well system (106) and the reservoir (102), such as on-demand adjustments in drilling fluid and regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the geological surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable the unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high-pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a camera (134). The camera (134) may be held in a position to take images of the entire rig (101) or determined segments of the rig (101). In one or more embodiments, multiple cameras (134) may be positioned in proximity of the rig (101) to capture different segments of the rig (101). Other types of image capturing devices may be used in addition to or in the alternative to a camera (134), such as any other image or vision sensor, including infrared, gamma ray, CT scan, x-ray, among others, for image/video capture.

To aid in a continuous separation operation, the camera (134) may be controlled by a timer and/or using a software program to take images at a selected interval. For example, a camera (134) may be controlled to take a picture at a timed interval, triggered by movement, or controlled manually. Alternatively, the camera may continuously record the rig (101).

Images taken by the camera (134) may be sent to the image recognition system (112), which may be located anywhere at the drilling site or in a cloud infrastructure. Any combination of mobile, desktop, server, router, switch, embedded device, or other types of hardware may be used for the image recognition system (112). For example, the image recognition system (112) may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities.

In one or more embodiments, the image recognition simulator (112) may include hardware and/or software with functionality for analyzing the obtained images. Further, the image recognition simulator (112) may store the previously obtained images, previously trained artificial intelligence (AI) models, imported pictures of different rig segments and their specification. For this purpose, the simulator may include memory with one or more data structures, such as a buffer, a table, an array, or any other suitable storage medium. The image recognition simulator (112) may further, at least, determine an operability and compatibility of different segments of the rig. While image recognition simulator (112) is shown at a well site, in some embodiments, the image recognition simulator (112) may be located remotely from well site. In some embodiments, image recognition simulator (112) may include a computer system that is similar to the computer system (800) described below with regard to FIG. 8 and the accompanying description.

In one or more embodiments, the act of drilling and completing a well involves the picking up and lowering tubulars into the well (100) in a repeated fashion. The process is then repeated each time that a bottom hole assembly or completion is inserted or retrieved from the well. The process relies on the tubing being latched into a device called a set of elevators, which are shown on FIG. 2. The elevator is used to latch around the top of pipe joints in the drill string. After latching, the pipe may be raised and lowered in and out of the hole. The elevator may be attached to the hook or top drive with two forged high-grade steel rods called links or bails. One end of the link fits into the link cars on the hook or top drive. Link locking arms secure the links into the cars. Most elevators are hinged and rig crews open and close them by operating the latch with two handles on each side. Further, the elevator has an opening on the side, where the tubular is fitted. The door is then closed again and, optionally, a locking pin is fitted.

Figure 3A:
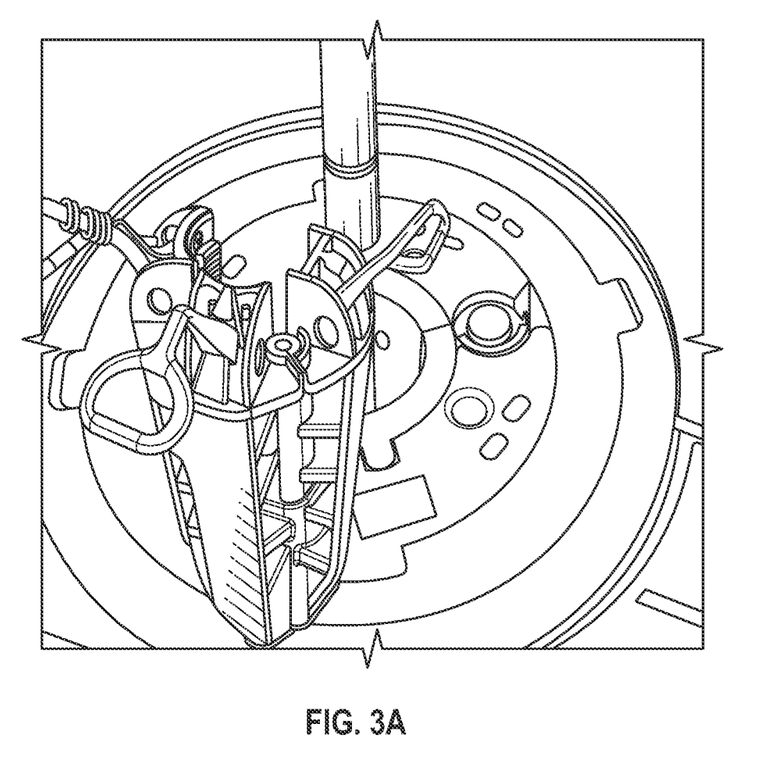
FIGS. 3A and 3B show a system according to embodiments of the present disclosure.

FIG. 3A shows a set of slips. The slips are wedge-shaped gripping devices which are used to suspend the drill string in the hole. The slips fit around the body of drill pipe and wedge in the taper of the opening in the rotary table. The slips have serrated inserts or dies that will grip the outside diameter of the tubular when it is set on the rotary table. The slips are placed around the pipe and the driller then slowly lowers the pipe until the slips can take up the load. The dies in the slips will firmly hold the pipe.

Figure 3B:
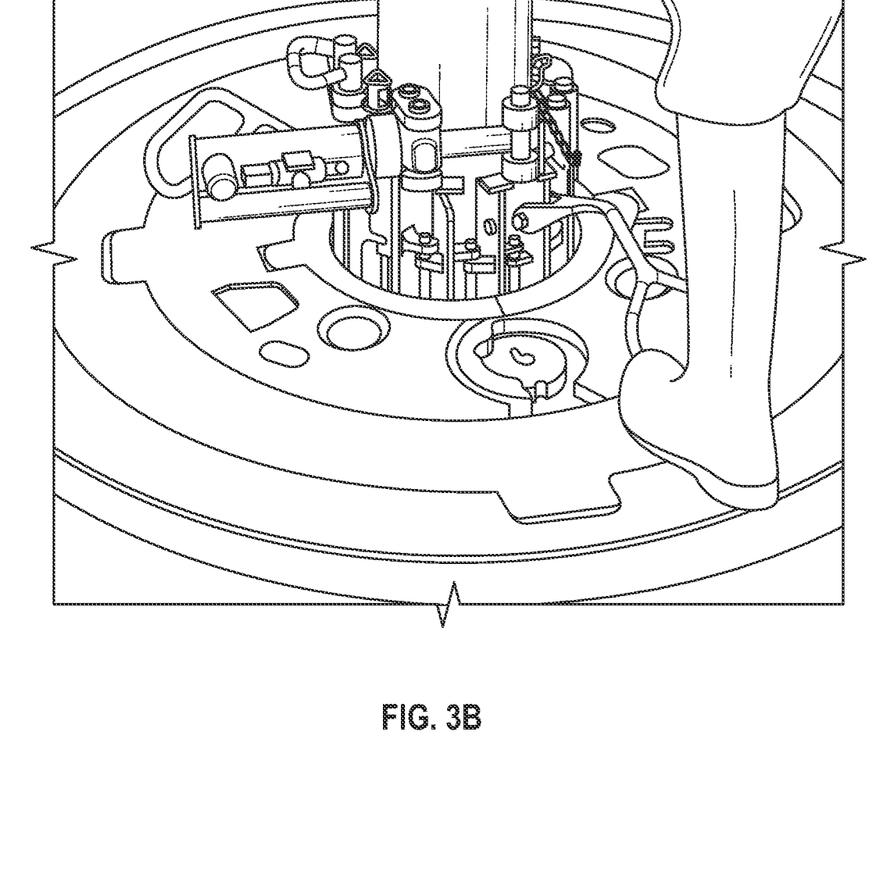

Further, as shown on FIG. 3B, when using drill collars and other tubulars that do not have an elevator shoulder, a safety clamp, such as a dog collar, is installed above the slips. If the gripping elements on the slips fail, the drill collar would slide down. Before the collars can slide all the way out of the slips into a well, the safety clamp would hold the collars against the top of the slips.

Figure 4:
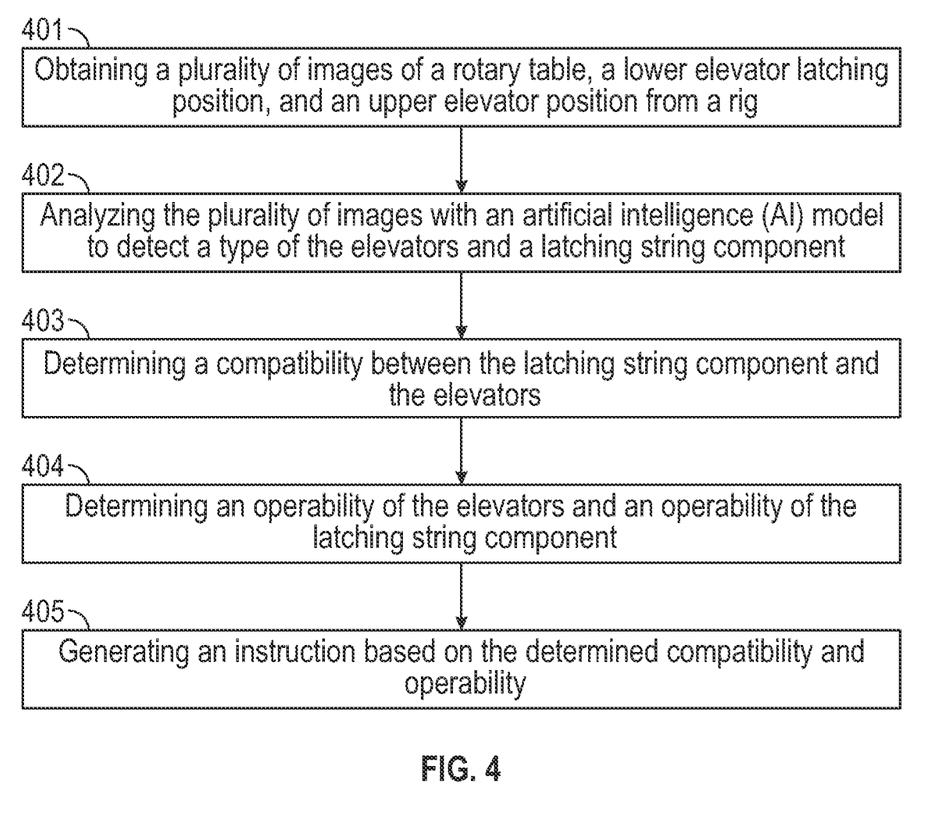
FIG. 4 shows a flowchart in accordance with one or more embodiments.
Figure 5:
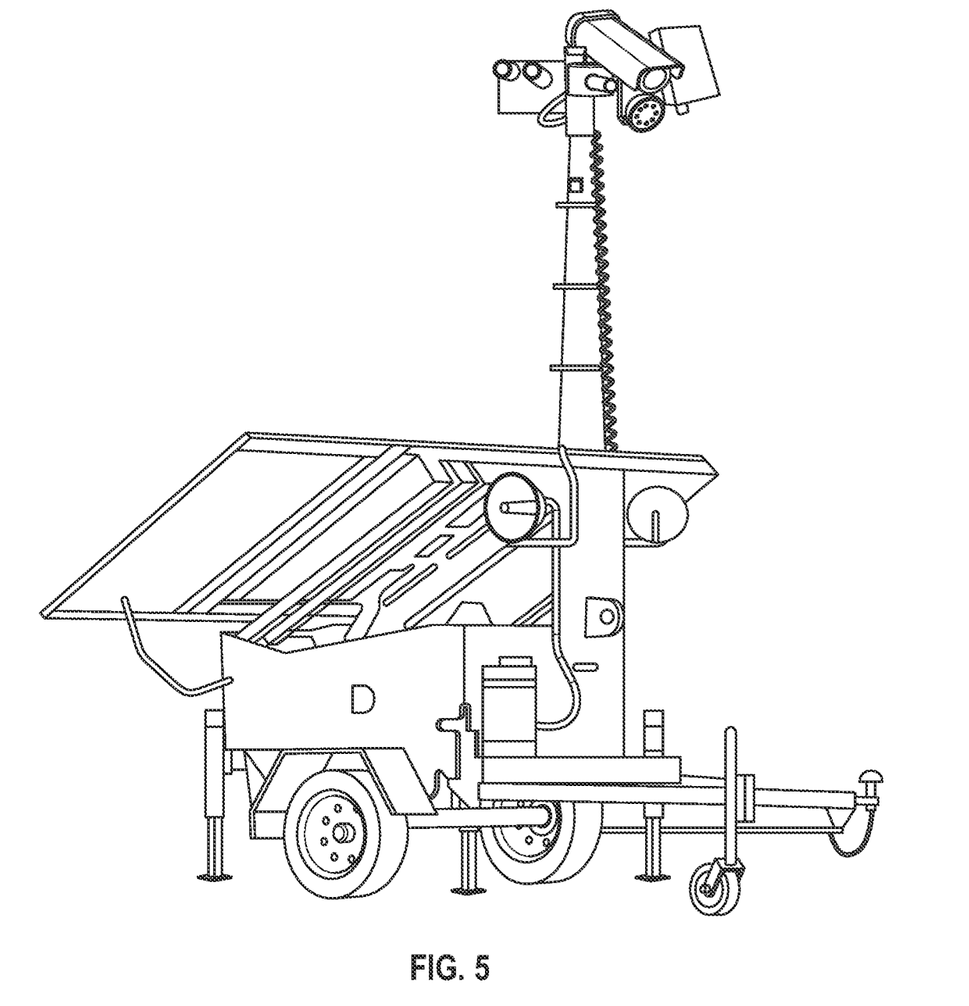
FIG. 5 shows a system according to embodiments of the present disclosure.

FIG. 4 shows a flowchart in accordance with one or more embodiments for image processing to reduce the risk of dropped string. Specifically, in Block 401, a plurality of images is obtained. In one or more embodiments, the plurality of images may be obtained in real-time. As shown in FIG. 5, the images, for example, may be obtained using a hardware platform that contains one or more portable self-contained camera unit. The camera units may be set up next to a rotary table, a lower elevator latching position, and an upper elevator position. Alternatively, the camera units may be placed at a distance from the rig, where the rotary table, the lower elevator latching position, and the upper elevator position may be captured.

Further, the camera may be a part of a larger manual or automatic system. The obtained image may be, for example, a binary image, a monochrome image, a color image, or a multispectral image. The image values, expressed in pixels, may be combined in various proportions to obtain different colors or properties. In one or more embodiments, the obtained image may have been captured and stored in a non-transient computer-readable medium as described in FIG. 8. The obtained image may be of any resolution.

The camera unit may be positioned in different manners, as required by the application. Further, the camera unit may be positioned so as to not interfere with the operation of the rig. In one or more embodiments, the camera unit may contain a solar power source, batteries, a processor, and a wireless interface. In one or more embodiments, the camera unit may be an internet of things (IoT) platform consisting of smart, waterproof, high resolution, wireless cameras, or image and vision sensor. Further, the sensors may include infrared, gamma-ray, CT scan, x-ray sensors for image and video capture.

In Block 402, the obtained images are uploaded to image recognition simulator (112). In one or more embodiments, the image recognition simulator (112) uses a pretrained machine learning model. The training may involve preparing the previously obtained data for the training. For example, the data may be scaled such that each parameter is in the same range (typically between 0 and 1) to improve the performance of the machine learning model. Further, the data may be split into training, testing, and validation sets. Training data may subsequently be used for training the machine learning model. Validation data may be used in order to decide whether enough learning has been achieved and training may be stopped. Testing data may be used to test the performance of the machine learning model after training in order to determine determines how well the machine learning model performs. In one example, 70% of the data may be used as training data and 30% of the data may be used as validation data.

The machine learning model may be based on any type of machine learning technique. For example, perceptrons, convolutional neural networks, deep neural networks, recurrent neural networks, support vector machines, decision trees, inductive learning models, deductive learning models, reinforcement learning models, etc. may be used. In some embodiments, two or more different types of machine-learning models are integrated into a single machine-learning architecture, e.g., a machine-learning model may include support vector machines and neural networks.

In some embodiments, various types of machine learning algorithms, e.g., backpropagation algorithms, may be used to train the machine learning models. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model. In some embodiments, historical data (e.g., production data recorded over time) may be augmented to generate synthetic data for training a machine learning model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of maintenance data or inspection data), with the output of the recurrent neural network being dependent on past computations (e.g., failure to perform maintenance or address an unsafe condition may produce one or more hazard incidents). As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm. For more information on reinforcement learning algorithms, see the discussion below.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc., may be used. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, one or more ensemble learning methods may be used in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

The selection of the machine learning model may involve selecting the machine learning model with the best performance based on the training of the method. The machine learning model with the best performance may be identified through repeated execution of steps using different machine learning models, until the best-performing machine learning model is identified.

The machine learning model analyzes the obtained images to identify different components and positions within the well system (100). In one or more embodiments, the machine learning model analyzes the obtained images to identify a rotary table, a lower elevator latching position, and an upper elevator position. Alternatively, the machine learning model may analyze images to identify any component of the well system (100).

Initially, the machine learning model is trained on training labeled data. The trained machine learning model analyzes each component to confirm that the correct component is selected for the operation. In the event that the incorrect component was selected or that the selected component cannot be recognized by the machine learning model, a warning instruction is issued to an operator. Alternatively, a confirmation instruction is issued to an operator.

In Block 403, compatibility between at least one of a lower elevator latching position and an upper elevator latching position, and the string component is determined. Specifically, the machine learning model analyzes the obtained images to determine, at least, sizes of diameters of the elevators, the latching string, and the slips. Further, the machine learning model measures the size of the components and compares the sizes of latching components, such as the latching string to the elevators and slips fitted to the rig to ensure that they are correctly sized. That procedure reduces the risk of dropped strings. In the event that the sizes of different latching component are not compatible, a warning instruction is issued to an operator. Alternatively, a confirmation instruction is issued to an operator.

In Block 404, operability of the lower elevator latching position, an upper elevator latching position, and the string component is determined. Specifically, the machine learning model analyzes the obtained images to determine, at least, whether the elevators are correctly latched, an elevator locking pin is fitted, the slips are correctly fitted, and the dog collar is correctly fitted. Specifically, the rotary table is used for slip placement, the lower elevator latching position is used to close a drill floor, and the upper elevator position to close the monkey board. The machine learning model recognizes the operation of each component and monitors a correct operation of each component. In the event that the latching component is not correctly fitted and latched, a warning instruction is issued to an operator. Alternatively, a confirmation instruction is issues to an operator.

In Block 405, an instruction is generated based on Blocks 402-404. The generated instruction is based on received instructions from machine learning models. Specifically, the generated instruction is based on the confirmed components from Block 402, the compatibility of components from Block 403, and the operability of components from Block 404. In one or more embodiments, when all received instructions are confirmative, without issued warnings, the interlock is deactivated and the operation continues to be carried out without interruptions, as the latching or lifting process continues. However, when a warning is issued by one of Blocks 402-404, an alert may be triggered.

In one or more embodiments, the alert is generated for each of the Blocks 402-404 not satisfying the requirement in accordance with one or more embodiments. The generated alert may be a warning issued to the operator and displayed using GUI, specifying a detected issue. Alternatively, the generated alert may activate a remediation command, together with the alert to the operator, such as an interlock of the system to stop a mistake from being made. Additionally, the remediation command may the allow initiation of an interlock to stop the latching process or prevent the blocks from being raised and lifting the string. Further, different actions may be generated for different warnings. Specifically, the warnings may be assigned with different levels and the actions may differ based on the level of the warning. For example, unrecognized component may trigger a warning to the operator, while incompatible/inoperable component may trigger the interlock activation. One of the ordinary skill in the art would understand that different levels may be applied to different warnings. Further, a report may be generated for the operator describing the process.

Further, in one or more embodiments, the image recognition simulator (112) may track implementation of various remediation procedures, e.g., with a remediation queue, and determine the status of implementing a particular remediation procedure. For example, the image recognition simulator (112) may schedule different remediation procedures for different times and in a predetermined sequence. This schedule may be controlled and/or adjusted using remediation commands, for example. Accordingly, the remediation data may provide a status update regarding one or more remediation procedures being performed by the image recognition simulator (112). Thus, in some embodiments, a remediation procedure is performed autonomously using the image recognition simulator (112).

Figure 6:
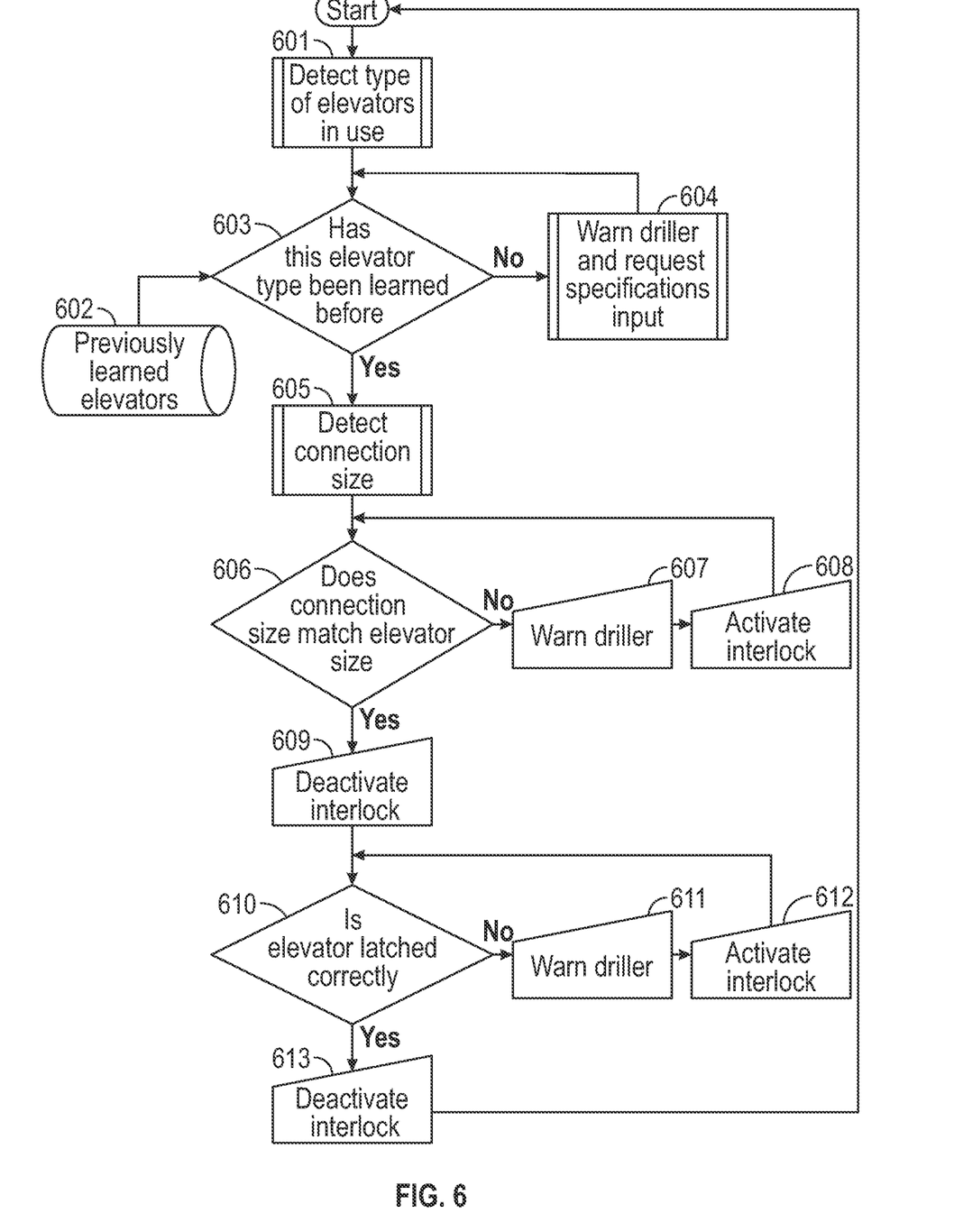
FIG. 6 shows an exemplary flowchart for method for reducing risk of incorrect elevator latching using the image recognition in accordance with one or more embodiments.

FIG. 6 shows a flowchart in accordance with one or more embodiments. Further, to the general description provided in FIG. 4, FIG. 6 shows an exemplary flowchart, which illustrates a method for reducing risk of incorrect elevator latching using the image recognition. Further, one or more blocks in FIG. 6 may be performed by one or more components as described in FIGS. 1 and 2. While the various blocks in FIG. 6 are presented and described sequentially, one of ordinary skill in the art will appreciate that some or all of the blocks may be executed in a different order, may be combined or omitted, and some or all of the blocks may be executed in parallel. Furthermore, the blocks may be performed actively or passively.

Initially, in Step 601, the image recognition simulator (112) uses a machine learning model to detect a type of elevator in use. In Step 603, the detected type of the elevator in use is compared to the previously learned elevators from Step 602. Determination is made based on the comparison. In a case that the elevator type has not been learned before, in Step 604 a warning is issued to the operator to input the specifications of the used elevator and the process restarts. Alternatively, when the image recognition simulator (112) recognizes a previously-learned elevator, the process continues.

In step 605, the image recognition simulator (112) uses a machine learning model to detect a connection size of a tubular pipe. Specifically, the image recognition simulator (112) determines a diameter of the tubular pipe. The connection size is compared to the size of the elevator and a determination is made, in Step 606, based on the compatibility of the compared sizes. In a case that the elevator size is not compatible with the connection size, the driller is warned in Step 607, and the interlock is activated in Step 608. Alternatively, when the elevator size is compatible with the connection size the interlock is deactivated in Step 609.

In Step 610, the image recognition simulator (112) detects whether the elevator is correctly latched. The determination is made, in Step 611, based on the success of operability of the elevator. In a case that the elevator is not correctly latched, the driller is warned in Step 611, and the interlock is activated in Step 612. Alternatively, when the elevator is correctly latched, the interlock is deactivated in Step 613.

Figure 7:
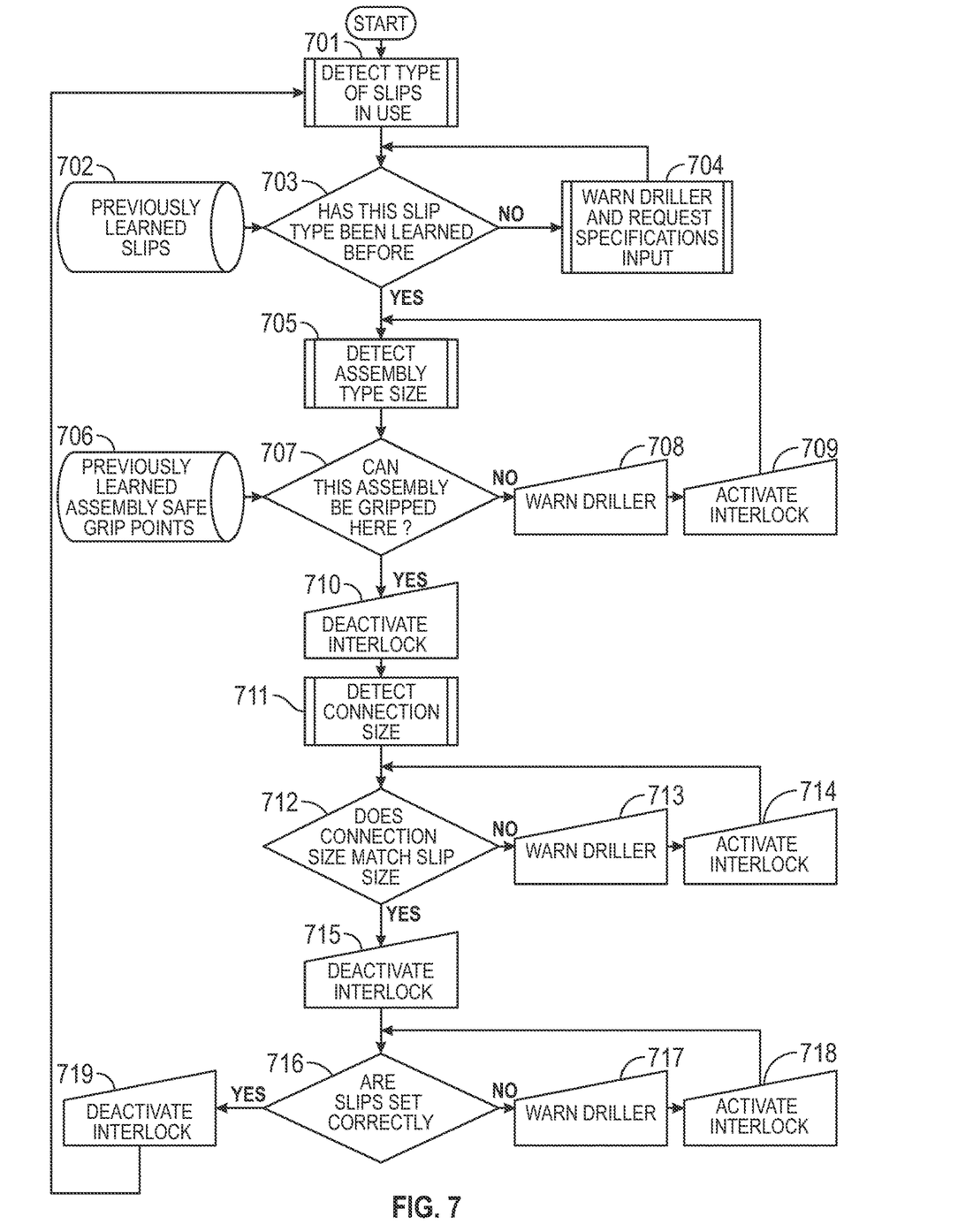
FIG. 7 shows an exemplary flowchart method for reducing risk of incorrect slips setting using the image recognition in accordance with one or more embodiments.

FIG. 7 shows a flowchart in accordance with one or more embodiments. Further, to the general description provided in FIG. 4, FIG. 7 shows an example flowchart, which illustrates a method for reducing risk of incorrect slip set detection using the image recognition. Further, one or more blocks in FIG. 7 may be performed by one or more components as described in FIGS. 1 and 2. While the various blocks in FIG. 7 are presented and described sequentially, one of ordinary skill in the art will appreciate that some or all of the blocks may be executed in a different order, may be combined or omitted, and some or all of the blocks may be executed in parallel. Furthermore, the blocks may be performed actively or passively.

Initially, in Step 701, the image recognition simulator (112) uses a machine learning model to detect a type of slips in use. In Step 703, the detected type of the slips in use is compared to the previously learned slips from Step 702. Determination is made based on the comparison. In case that the slips type has not been learned before, a warning is issued in Step 704 to the operator to input the specifications of the used slips and the process restarts. Alternatively, when the image recognition simulator (112) recognizes a previously-learned slip, the process continues.

In Step 705, the image recognition simulator (112) uses a machine learning model to detect a type of assembly in use. In Step 707, the detected type of the assembly in use is compared to the previously learned assembly safe grip points from Step 706. Determination is made, based on the comparison, whether the assembly may be correctly gripped. In a case that the assembly may not be correctly gripped, the driller is warned in Step 708, and the interlock is activated in Step 709. Alternatively, when the assembly is correctly gripped, the interlock is deactivated in Step 710.

In step 711, the image recognition simulator (112) uses a machine learning model to detect a connection size of a tubular pipe. Specifically, the image recognition simulator (112) determines a diameter of the tubular pipe. The connection size is compared to the size of the slip and a determination is made, in Step 712, based on the compatibility of the compared sizes. In a case that the slip size is not compatible with the connection size, the driller is warned in Step 713, and the interlock is activated in Step 714. Alternatively, when the slip size is compatible with the connection size the interlock is deactivated in Step 715.

In Step 716, the image recognition simulator (112) detects whether the slips are correctly set. The determination is made based on the success of operability of the slips. In a case that the slips are not correctly set, the driller is warned in Step 717, and the interlock is activated in Step 718. Alternatively, when the elevator is correctly latched, the interlock is deactivated in Step 719.

Figure 8:
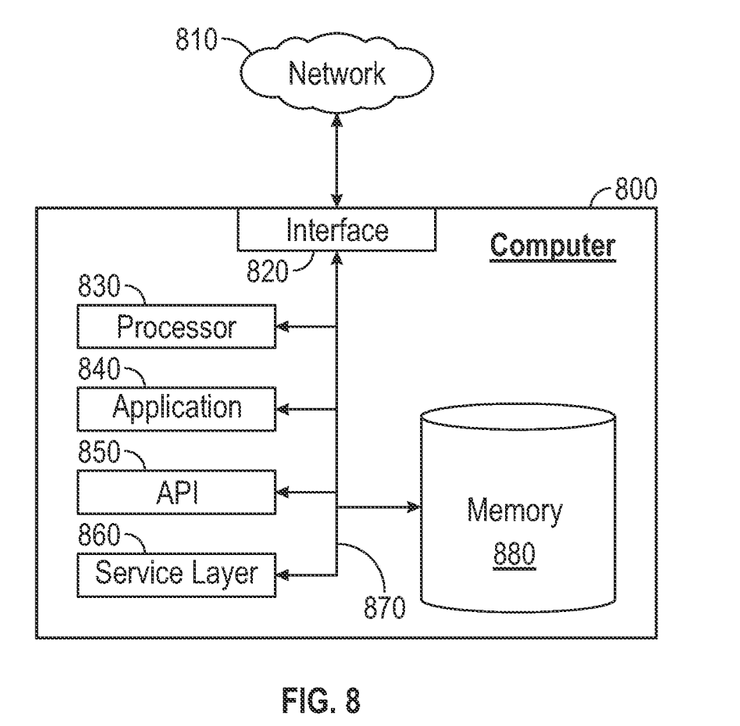
FIG. 8 shows a computer system in accordance with one or more embodiments.

Embodiments may be implemented on any suitable computing device, such as the computer system shown in FIG. 8. FIG. 8 is a block diagram of a computer system (800) used to provide computational functionalities associated with described algorithms, methods, functions, processes, flows, and procedures as described in the instant disclosure, according to an implementation. Additionally, the embodiments may be implemented as a standalone software or a plug-in using another software to operate. The illustrated computer (800) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (800) may include a computer that includes an input device, such as a keypad, keyboard, touch screen, or other device that can accept user information, and an output device that conveys information associated with the operation of the computer (800), including digital data, visual, or audio information (or a combination of information), or a GUI.

The computer (800) can serve in a role as a client, network component, a server, a database or other persistency, or any other component (or a combination of roles) of a computer system for performing the subject matter described in the instant disclosure. The illustrated computer (800) is communicably coupled with a network (810). In some implementations, one or more components of the computer (800) may be configured to operate within environments, including cloud-computing-based, local, global, or other environment (or a combination of environments).

At a high level, the computer (800) is an electronic computing device operable to receive, transmit, process, store, or manage data and information associated with the described subject matter. According to some implementations, the computer (800) may also include or be communicably coupled with an application server, e-mail server, web server, caching server, streaming data server, business intelligence (BI) server, or other server (or a combination of servers).

The computer (800) can receive requests over network (810) from a client application (for example, executing on another computer (800) and responding to the received requests by processing the said requests in an appropriate software application. In addition, requests may also be sent to the computer (800) from internal users (for example, from a command console or by other appropriate access method), external or third-parties, other automated applications, as well as any other appropriate entities, individuals, systems, or computers.

Each of the components of the computer (800) can communicate using a system bus (870). In some implementations, any or all of the components of the computer (800), both hardware or software (or a combination of hardware and software), may interface with each other or the interface (820) (or a combination of both) over the system bus (870) using an application programming interface (API) (850) or a service layer (860) (or a combination of the API (850) and service layer (860). The API (850) may include specifications for routines, data structures, and object classes. The API (850) may be either computer-language independent or dependent and refer to a complete interface, a single function, or even a set of APIs. The service layer (860) provides software services to the computer (800) or other components (whether or not illustrated) that are communicably coupled to the computer (800). The functionality of the computer (800) may be accessible for all service consumers using this service layer. Software services, such as those provided by the service layer (860), provide reusable, defined business functionalities through a defined interface. For example, the interface may be software written in JAVA, C++, or other suitable language providing data in extensible markup language (XML) format or other suitable format. While illustrated as an integrated component of the computer (800), alternative implementations may illustrate the API (850) or the service layer (860) as stand-alone components in relation to other components of the computer (800) or other components (whether or not illustrated) that are communicably coupled to the computer (800). Moreover, any or all parts of the API (850) or the service layer (860) may be implemented as child or sub-modules of another software module, enterprise application, or hardware module without departing from the scope of this disclosure.

The computer (800) includes an interface (820). Although illustrated as a single interface (820) in FIG. 8, two or more interfaces (820) may be used according to particular needs, desires, or particular implementations of the computer (800). The interface (820) is used by the computer (800) for communicating with other systems in a distributed environment that are connected to the network (810). Generally, the interface (820 includes logic encoded in software or hardware (or a combination of software and hardware) and operable to communicate with the network (810). More specifically, the interface (820) may include software supporting one or more communication protocols associated with communications such that the network (810) or interface's hardware is operable to communicate physical signals within and outside of the illustrated computer (800).

The computer (800) includes at least one computer processor (830). Although illustrated as a single computer processor (830) in FIG. 8, two or more processors may be used according to particular needs, desires, or particular implementations of the computer (800). Generally, the computer processor (830) executes instructions and manipulates data to perform the operations of the computer (800) and any algorithms, methods, functions, processes, flows, and procedures as described in the instant disclosure.

The computer (800) also includes a memory (880) that holds data for the computer (800) or other components (or a combination of both) that can be connected to the network (810). For example, memory (880) can be a database storing data consistent with this disclosure. Although illustrated as a single memory (880) in FIG. 8, two or more memories may be used according to particular needs, desires, or particular implementations of the computer (800) and the described functionality. While memory (880) is illustrated as an integral component of the computer (800), in alternative implementations, memory (880) can be external to the computer (800).

The application (840) is an algorithmic software engine providing functionality according to particular needs, desires, or particular implementations of the computer (800), particularly with respect to functionality described in this disclosure. For example, application (840) can serve as one or more components, modules, applications, etc. Further, although illustrated as a single application (840), the application (840) may be implemented as multiple applications (840) on the computer (800). In addition, although illustrated as integral to the computer (800), in alternative implementations, the application (840) can be external to the computer (800).

There may be any number of computers (800) associated with, or external to, a computer system containing computer (800), each computer (800) communicating over network (810). Further, the term "client," "user," and other appropriate terminology may be used interchangeably as appropriate without departing from the scope of this disclosure. Moreover, this disclosure contemplates that many users may use one computer (800), or that one user may use multiple computers (800).

In some embodiments, the computer (800) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (Saas), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:
obtaining, using a camera, a plurality of images of a rotary table, a lower elevator latching position, and an upper elevator position from a rig;
analyzing, using a computer processor, the plurality of images of the rotary table, the lower elevator latching position, and the upper elevator position with an artificial intelligence (AI) model to detect a type of the elevators and a latching string component;
determining, using the computer processor, an operability of the elevators and an operability of the latching string component;
determining, using the computer processor, a compatibility between the latching string component and the elevators; and
generating, using the computer processor, an instruction based on the determined compatibility, the instruction allowing a latching or lifting process to continue or initiating an interlock to stop the latching process or preventing blocks from being raised and lifting the string.

2. The method of claim 1, further comprising determining, using the computer processor, a compatibility between the latching string component and slips, the latching string component being set in the slips, and
determining, using the computer processor, whether a dog collar is correctly sized and fitted.

3. The method of claim 1, further comprising generating, using the computer processor, a report on the determined operability and compatibility of the latching string component and the elevators and the generated instruction, and
displaying, using a graphical user interface, the report to a user.

4. The method of claim 1, wherein the AI model is pretrained with the plurality of images of the rotary table, the lower elevator latching position, and the upper elevator position.

5. The method of claim 1, wherein the operability of the elevators includes the elevators being correctly latched and an elevator locking pin being fitter, and wherein the operability of the latching string includes correctly fitting slips of the latching string.

6. The method of claim 1, wherein the compatibility between the latching string component and the elevators is determined by comparing a size of the elevators and a size of the latching string component.

7. The method of claim 1, wherein the plurality of images is obtained in real time.

8. A non-transitory computer readable medium storing instructions executable by a computer processor, the instructions comprising functionality for:
obtaining, using a camera, a plurality of images of a rotary table, a lower elevator latching position, and an upper elevator position from a rig;
analyzing the plurality of images of the rotary table, the lower elevator latching position, and the upper elevator position with an artificial intelligence (AI) model to detect a type of the elevators and a latching string component;
determining an operability of the elevators and an operability of the latching string component;
determining a compatibility between the latching string component and the elevators; and
generating an instruction based on the determined compatibility, the instruction allowing a latching or lifting process to continue or initiating an interlock to stop the latching process or preventing blocks from being raised and lifting the string.

9. The non-transitory computer readable medium of claim 8, further comprising determining, using the computer processor, a compatibility between the latching string component and slips, the latching string component being set in the slips, and
determining, using the computer processor, whether a dog collar is correctly sized and fitted.

10. The non-transitory computer readable medium of claim 9, further comprising generating, using the computer processor, a report on the determined operability and compatibility of the latching string component and the elevators and the generated instruction, and
displaying, using a graphical user interface, the report to a user.

11. The non-transitory computer readable medium of claim 8, wherein the AI model is pretrained with the plurality of images of the rotary table, the lower elevator latching position, and the upper elevator position.

12. The non-transitory computer readable medium of claim 8, wherein the operability of the elevators includes the elevators being correctly latched and an elevator locking pin being fitter, and wherein the operability of the latching string includes correctly fitting slips of the latching string.

13. The non-transitory computer readable medium of claim 8, wherein the compatibility between the latching string component and the elevators is determined by comparing a size of the elevators and a size of the latching string component.

14. A system comprising:
a camera; and
an image recognition simulator comprising a computer processor, wherein the image recognition simulator is coupled to the camera, the image recognition simulator comprising functionality for:
  obtaining, using the camera, a plurality of images of a rotary table, a lower elevator latching position, and an upper elevator position from a rig;
  analyzing the plurality of images of the rotary table, the lower elevator latching position, and the upper elevator position with an artificial intelligence (AI) model to detect a type of the elevators and a latching string component;
  determining an operability of the elevators and an operability of the latching string component;
  determining a compatibility between the latching string component and the elevators; and
  generating an instruction based on the determined compatibility, the instruction allowing a latching or lifting process to continue or initiating an interlock to stop the latching process or preventing blocks from being raised and lifting the string.

15. The system of claim 14, further comprising determining, using the computer processor, a compatibility between the latching string component and slips, the latching string component being set in the slips, and determining, using the computer processor, whether a dog collar is correctly sized and fitted.

16. The system of claim 14, further comprising generating, using the computer processor, a report on the determined operability and compatibility of the latching string component and the elevators and the generated instruction, and
displaying, using a graphical user interface, the report to a user.

17. The system of claim 14, wherein the AI model is pretrained with the plurality of images of the rotary table, the lower elevator latching position, and the upper elevator position.

18. The system of claim 14, wherein the operability of the elevators includes the elevators being correctly latched and an elevator locking pin being fitter, and wherein the operability of the latching string includes correctly fitting slips of the latching string.

19. The system of claim 14, wherein the compatibility between the latching string component and the elevators is determined by comparing a size of the elevators and a size of the latching string component.

20. The system of claim 14, wherein the plurality of images is obtained in real time.

* * * * *